3,454,211
POUCH FOR FROZEN FOOD PRODUCTS
Kenneth Carl Hoffman, Chicago, Ill., assignor to Arvey Corporation, a corporation of Delaware
Filed Jan. 2, 1968, Ser. No. 695,260
Int. Cl. B65d *31/00, 33/00*
U.S. Cl. 229—53       3 Claims

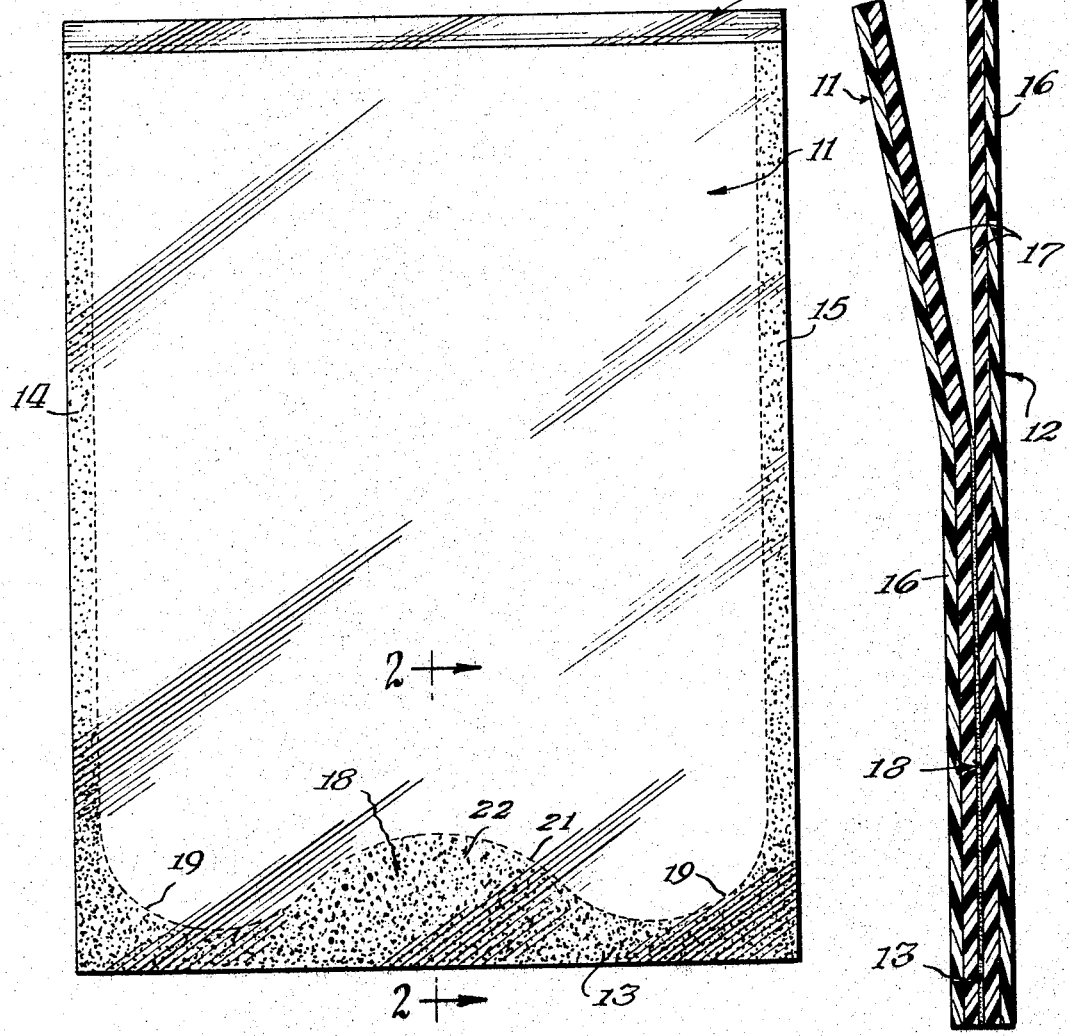
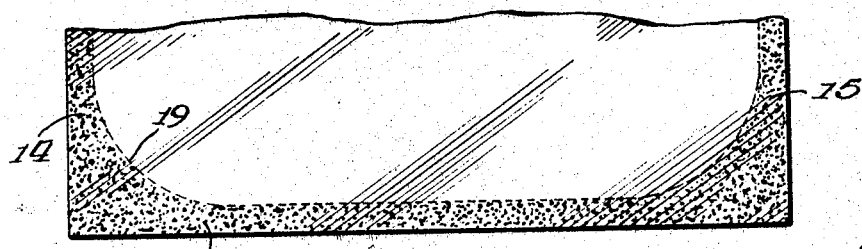

ABSTRACT OF THE DISCLOSURE

A pouch for frozen food products is heat-sealed along three sides and is then filled through the open side. The open side of the pouch is heat-sealed after the pouch is filled. The frozen food products may thaw somewhat during the packaging operation, and the sealed package is frozen again to compensate for such thawing. The frozen food products expand during the second freezing operation, and the sealing zones at the bottom corners of the pouch are curved to reduce the stress concentration at those corners to prevent the bag from bursting.

---

This invention relates to a pouch for holding frozen food products, such as vegetables, for example, and is particularly concerned with means for preventing the pouch from bursting when it is subjected to freezing with the food product sealed therein.

In current practice, pouches are filled with frozen vegetables and then butter sauce is added. The air is pulled out of the pouch as the open top of the pouch is being heat-sealed. The sealed pouch, with the vegetables therein, is then frozen to compensate for any thawing that might have taken place during the packaging. The freezing causes the vegetables to expand and, since the vegetables are more heavily concentrated adjacent the bottom of the pouch, the expansion of the vegetables often causes the pouch to burst near its bottom, which results in the escape of the butter sauce, and attendant problems.

In accordance with the present invention, the sealing area inside the pouch adjacent its bottom is curved at its ends so that the corners are not accessible to the vegetables when they are introduced into the pouch. After the frozen vegetables that are placed in the pouch are thawed and refrozen, the reinforced corner construction prevents any expansion of the normally heavy concentration of vegetables near the bottom of the pouch from breaking either the walls of the pouch or the relatively strong seal at the corners of the pouch.

Suitable structure by means of which the above mentioned and other advantages of the invention are attained will be fully described in the following specification, taken in conjuction with the accompanying drawings showing a few preferred embodiments of the invention, in which:

FIGURE 1 is plan view of a pouch embodying the invention;

FIGURE 2 is an enlarged cross-sectional view, taken in the plane indicated by the line 2—2 of FIGURE 1; and FIGURE 3 is a fragmentary plan view of another embodiment of the invention.

In the drawings, two superimposed laminated transparent sheets 11 and 12 are heat-sealed adjacent the bottom and two sides, as indicated at 13, 14, and 15, respectively, to form a pouch open at its top to receive frozen vegetables or other frozen food products. Preferably the upper end of the sheet 12 extends a short distance above the upper end of the sheet 11 to facilitate spreading the top of the pouch for the filling operation.

The sheets 11 and 12 are laminated so that when they are superimposed to form the pouch each sheet has an inner surface that can be heat-sealed, and an outer surface capable of giving the pouch the required strength. The inner surface may be transparent film 16 of polytheylene, for example, or any other suitable plastic capable of being heal-sealed. The outer surface may be a transparent film 17 of cellophane or polyethylene terephthalate resin, for example. The film 16 are fused together along the bottom and two adjacent edges of the pouch by the heat-sealing, resulting in a seal 18 that is stronger than the walls of the pouch. The top edge of the heat-seal extending along the bottom of the pouch is curved upwardly adjacent its outer ends to provide rounded corners at the bottom of the pouch, as indicated at 19. The curved shape of the seal at each of the bottom corners of the pouch reduces the stress concentration at the corners to prevent the pouch from bursting from the stresses caused by the expansion of the vegetables when the sealed package is frozen.

In the embodiment of the invention illustrated in FIGURE 1, the seal along the bottom of the pouch is in the form of a sinuous curve 21. The enlarged sealing area reduces the stress concentration further by reducing the concentration of vegetables adjacent the bottom of the pouch.

In use, the vegetables are frozen and introduced into the pouch through the open top. The curved shape of the top edge of the heat-seal adjacent each bottom corner of the pouch prevents concentration of the vegetables closely adjacent said corners. Butter sauce is then added and the pouch is evacuated by pulling out the air at the same time the top opening is heat-sealed to form a seal similar to the seals at the sides of the pouch. The completely sealed pouch is then placed in a container and quick-frozen again to compensate for any thawing that might have occurred during the packaging and heat-sealing opeartion. The vegetables normally expand during this second freezing and, since they are more heavily concentrated at the bottom, some provision must be made to prevent this expansion from rupturing the pouch sidewalls. The curved shape of the corners 19 reduces the stress concentration at the corners sufficiently to prevent the expansion of the vegetables from breaking either the walls of the pouch adjacent the corners, or the seals between the sheets along the perimeter of the pouch.

Although a few embodiments of the invention have been described in considerable detail, it will be understood that the description thereof is intended to be illustrative, rather than restrictive, as many details of construction may be modified or changed without departing from the spirit or scope of the invention. For example, while the pouch disclosed herein is described as being formed of certain materials and containing particular products, the invention is clearly not limited to the use of such materials. Similarly, while in the described embodiment the pouch is used to contain food products, it can also be used to contain other products wherein the conditions exist that require a pouch of this configuration. Also, while the pouch seals are described as being formed by the application of heat, the invention obviously would include other types of sealing means as long as the particular criteria set forth herein have been met. Furthermore, while the illustrated pouch is shown as being formed with seals along its full outer perimeter, the pouch could be made from a tube which could have but two transverse seals and one, or no longitudinal seals, depending on whether or not the tube was extruded. In addition, while the pouch configuration illustrated employs rounded corners, they could be angularly arranged as long as reinforcement of the corner was obtained. For example, the corner could be disposed at a 45° angle or some other appropriate angle to obtain the desired result. Accordingly, it is not desired to be restricted to the exact structure described.

What is claimed is:

1. A generally rectangular pouch adapted to hold a product subject to expansion by freezing after being packaged in said pouch, said pouch being closed on three sides and having an open side adapted to be sealed after introduction of the food product into the pouch, the closed area at each of the bottom corners of the pouch having an inner portion which is curved, whereby when the product within the pouch is caused to expand during freezing the bottom corners of the pouch which are subject to a high stress concentration will not burst.

2. A pouch as set forth in claim 1 which is made up of a plurality of sheets and in which the bottom and two adjacent sides are closed by heat-seals, the top edge of the heat-seal extending along the bottom of the pouch is curved upwardly adjacent its outer ends.

3. A pouch as recited in claim 1, in which the top edge of said heat-seal at the bottom of said pouch extends from one side of said pouch to the opposite side in a sinuous curve.

References Cited

UNITED STATES PATENTS 2,880,925  4/1959  Klasing et al. _____ 229—53
2,923,404  2/1960  Adell _____ 206—56

FOREIGN PATENTS 690,614  4/1953  Great Britain.

DAVID M. BOCKENEK, *Primary Examiner.*

U.S. Cl. X.R.

99—171; 206—56; 229—62